US009133635B2

(12) United States Patent
Titcomb et al.

(10) Patent No.: US 9,133,635 B2
(45) Date of Patent: Sep. 15, 2015

(54) ADJUSTABLE TIE ROD ASSEMBLY EMPLOYING A FREE SWIVELING CAPABILITY

(71) Applicant: Titcomb Brothers Manufacturing, Inc., Westport, MA (US)

(72) Inventors: Paul S. Titcomb, East Sandwich, MA (US); Ted Titcomb, East Sandwich, MA (US)

(73) Assignee: Titcomb Brothers Manufacturing, Inc., Westport, MA (US)

( * ) Notice: Subject to any disclaimer, the term of this patent is extended or adjusted under 35 U.S.C. 154(b) by 0 days.

(21) Appl. No.: 14/266,099

(22) Filed: Apr. 30, 2014

(65) Prior Publication Data

US 2014/0326853 A1     Nov. 6, 2014

Related U.S. Application Data

(60) Provisional application No. 61/818,222, filed on May 1, 2013.

(51) Int. Cl.

| E04G 17/065 | (2006.01) |
|---|---|
| F16G 11/12 | (2006.01) |
| F16G 15/08 | (2006.01) |
| E04G 17/00 | (2006.01) |
| E02D 17/18 | (2006.01) |
| E04G 11/06 | (2006.01) |
| E02D 17/20 | (2006.01) |

(52) U.S. Cl.
CPC .............. *E04G 17/001* (2013.01); *E02D 17/18* (2013.01); *E04G 11/06* (2013.01); *E04G 17/0658* (2013.01); *F16G 11/12* (2013.01); *E02D 17/20* (2013.01)

(58) Field of Classification Search
CPC ....... F16G 11/12; F16G 15/08; E04G 17/065; E04G 17/0658
USPC ................ 249/213, 214, 215, 42; 405/16, 18; 403/43, 44, 45, 46, 47, 60, 78; 52/151
See application file for complete search history.

(56) References Cited

U.S. PATENT DOCUMENTS

| 125,999 | A | * | 4/1872 | White | 403/60 |
|---|---|---|---|---|---|
| 141,191 | A | * | 7/1873 | Wilson | 403/43 |
| 445,625 | A | * | 2/1891 | Williams | 403/60 |
| 772,456 | A | * | 10/1904 | Chandler | 403/60 |
| 1,003,355 | A | * | 9/1911 | Green | 403/60 |

(Continued)

*Primary Examiner* — Michael Safavi
(74) *Attorney, Agent, or Firm* — Wolf, Greenfield & Sacks, P.C.

(57) ABSTRACT

The present disclosure relates to tie components that allow for the length of an overall tie assembly to be adjustable, after being anchored in place. Such tie components may exhibit a swiveling capability where a portion thereof may rotate with respect to a corresponding adjustment member, resulting in movement of the tie component and adjustment member back and forth relative to one another, as desired. One or more tie components of a tie assembly may be anchored (e.g., to a wall), yet the overall length, or tension, of the tie assembly may be adjusted. A tie component may include a first portion having an anchor end that may be fixed to a wall, and a swivel end located opposite thereof. The tie component may also include a second portion having an adjustment end that may engage with an appropriate adjustment member, and a swivel end located opposite thereof. The respective swivel ends of the first and second portions of the tie component may be rotatably coupled.

65 Claims, 13 Drawing Sheets

(56) References Cited

U.S. PATENT DOCUMENTS

| | | | | |
|---|---|---|---|---|
| 1,069,821 | A | * | 8/1913 | Sherwood ..................... 249/213 |
| 1,078,007 | A | * | 11/1913 | Stange ............................ 52/704 |
| 1,118,213 | A | * | 11/1914 | Moore ............................. 403/60 |
| 1,201,146 | A | * | 10/1916 | Cerney ............................ 403/60 |
| 1,257,827 | A | * | 2/1918 | Emmons ...................... 249/215 |
| 1,296,835 | A | * | 3/1919 | Monsen ........................ 403/60 |
| 1,472,992 | A | * | 11/1923 | Roeglin ........................ 254/100 |
| 1,532,150 | A | * | 4/1925 | Olson ............................ 403/78 |
| 1,762,740 | A | * | 6/1930 | Rains .............................. 52/151 |
| 1,828,350 | A | * | 10/1931 | Williams ........................ 256/35 |
| 1,950,018 | A | * | 3/1934 | Anderson .................... 249/215 |
| 2,004,462 | A | * | 6/1935 | Bush .............................. 249/42 |
| 2,040,790 | A | * | 5/1936 | Kaufmann ..................... 403/78 |
| 2,270,448 | A | * | 1/1942 | Juhl ............................. 269/243 |
| 2,281,833 | A | * | 5/1942 | De Canio ..................... 249/217 |
| 2,292,548 | A | * | 8/1942 | Schenk ......................... 249/215 |
| 2,335,338 | A | * | 11/1943 | Hillberg ....................... 249/215 |
| 2,580,170 | A | * | 12/1951 | Grimmer ....................... 74/89.4 |
| 2,614,311 | A | * | 10/1952 | Shook ............................. 249/34 |
| 2,732,606 | A | * | 1/1956 | Wheeler ....................... 249/215 |
| 2,741,821 | A | * | 4/1956 | Findley ........................ 249/189 |
| 2,851,294 | A | * | 9/1958 | Mount ............................ 403/78 |
| 2,903,283 | A | * | 9/1959 | Sweetland ...................... 403/78 |
| 3,030,061 | A | * | 4/1962 | Jennings ................... 248/354.3 |
| 3,168,772 | A | * | 2/1965 | Williams ....................... 249/42 |
| 3,198,476 | A | * | 8/1965 | Smith ............................. 249/42 |
| 4,438,612 | A | * | 3/1984 | Bernard et al. ................. 52/427 |
| 6,256,962 | B1 | * | 7/2001 | Boeshart ................... 52/745.09 |
| 6,802,675 | B2 | * | 10/2004 | Timmons et al. ............. 405/284 |
| 6,902,341 | B1 | * | 6/2005 | Rauschert ...................... 403/43 |
| 7,556,448 | B2 | * | 7/2009 | Hu .................................. 403/43 |

\* cited by examiner

ADJUSTABLE TIE ROD ASSEMBLY EMPLOYING A FREE SWIVELING CAPABILITY

BACKGROUND

1. Field

Aspects described herein relate generally to tie components, assemblies and methods of installation.

2. Discussion of Related Art

Concrete is a composition used to form walls, floors, roofs and other structural materials. Concrete includes a coarse granular material embedded in a hard matrix of material, such as cement or binder. The cement or binder fills space that may otherwise exist between aggregate particles, and adheres them together.

In forming a concrete wall, tie assemblies, or tie rod assemblies, for concrete forms are often used to hold spaced apart sections of wall panels in place when the concrete is poured between the wall panels. Such tie assemblies have components that are latched to, or embedded in, the wall, and may exhibit relatively high tensile strength (e.g., at least 2800 lbs). Such tensile strength may be sufficient to resist large hydrostatic stresses that may arise from the poured concrete.

Some tie components include an anchoring section and an adjustment section. The anchoring section is generally configured to be fixed to or otherwise coupled with a wall panel. The adjustment section typically includes a threaded coil that permits a threaded adjustment rod to be manipulated (e.g., screwed) back and forth along the coil. Another tie component, having respective anchoring and adjustment sections, may be coupled or fixed to an opposing wall panel. Accordingly, a tie assembly may include one tie component anchored to one wall and another tie component anchored to an opposing wall. The threaded rod is engaged with respective threaded coils of each of the tie components. In some cases, the threaded rod is attached to one of the tie components (e.g., formed as a single monolithic component).

SUMMARY

Tie components in accordance with the present disclosure allow for the length of an overall tie assembly to be adjustable, after being anchored in place. In some embodiments, such tie components employ a swiveling capability, for example, where opposing ends of the tie component are rotatable relative to one another. The inventors have recognized that it would be beneficial for a portion of the tie component to rotate with respect to an adjustment member (e.g., threaded rod), while the anchor end of the same tie component remains fixed (e.g., attached to the wall panel). Such a feature provides the ability to adjust the length, or tension, of an overall tie assembly where the tie component(s) associated with the tie assembly remain(s) fixedly attached to the respective wall panel(s).

In various embodiments, a tie component may include a first portion having an anchor end, which is adapted to be fixed to a wall, and a swivel end, located opposite the anchor end. The tie component may also include a second portion having an adjustment end, adapted to engage with an adjustment member, and a swivel end, located opposite the adjustment end. In various embodiments, the swivel end of the first portion of a tie component and the swivel end of the second portion of the tie component may be rotatably coupled to one another.

In an illustrative embodiment, a tie component is provided. The tie component includes a first portion having an anchor end adapted to be fixed to a wall section and a swivel end located opposite the anchor end. The tie component also includes a second portion having an adjustment end adapted to engage with an adjustment member and a swivel end located opposite the adjustment end, wherein the swivel end of the first portion and the swivel end of the second portion are rotatably coupled to one another.

In another illustrative embodiment, a method of adjusting a tie assembly is provided. The method includes anchoring a first tie component to a first wall section, the first tie component having opposing ends configured to rotate with respect to one another; and coupling a first end of an adjustment member to an adjustment end of the first tie component. The method includes anchoring a second tie component to a second wall section at a location spaced from the first wall section; and coupling a second end of the adjustment member to an adjustment end of the second tie component. The method further includes rotating the adjustment member relative to the adjustment end of the first tie component to modify a position of the adjustment member between the first tie component and the second tie component.

In yet another illustrative embodiment, a tie component is provided. The tie component includes an anchor portion having an end adapted to be fixed to a wall section; and an adjustment portion adapted to engage with an adjustment member, wherein the anchor portion and the adjustment portion are rotatably coupled to one another.

Various embodiments provide certain advantages. Not all embodiments of the present disclosure share the same advantages and those that do may not share them under all circumstances.

Further features and advantages of the present disclosure, as well as the structure of various embodiments are described in detail below with reference to the accompanying drawings.

BRIEF DESCRIPTION OF THE DRAWINGS

Various embodiments will now be described, by way of example, with reference to the accompanying drawings, in which.

DETAILED DESCRIPTION

Figure 1A:
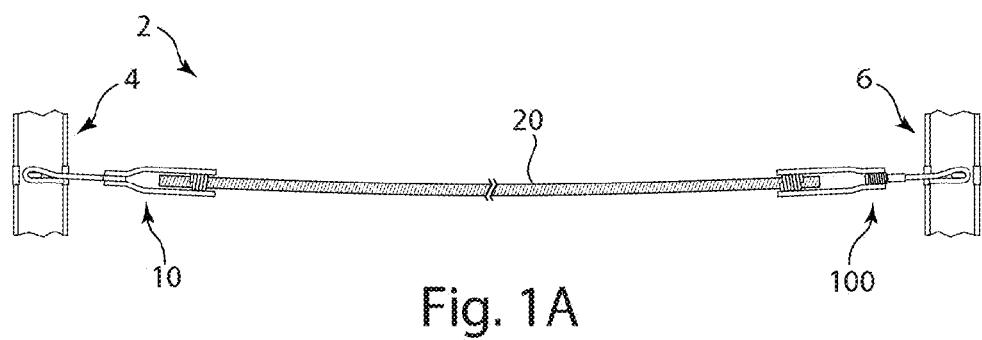
FIGS. 1A-1B depict a tie assembly in accordance with an embodiment.

The present disclosure relates to tie components that are adapted to be placed between wall panels, or other faces, for forming a wall, such as a concrete wall. When concrete is poured between the space provided between separate wall panels, the pre-cured concrete may generate substantial stresses against the wall panels. That is, because the pre-cured concrete is able to flow, the weight associated with the concrete may bear significantly upon the wall panels, which may be positioned on either side of the concrete. To mitigate against the potential failure of one or more of the wall panels, tie assemblies may be used to hold the concrete forms together and may, in particular, take on stresses arising from the pre-cured concrete.

A tie assembly may include, for example, one or more tie components coupled with an adjustment member or other connecting structure. A tie component may have an anchor end and an adjustment end. The anchor end may be constructed to be affixed to a wall panel, and the adjustment end may be configured to engage with the adjustment member. In some embodiments, opposite ends of the adjustment member (e.g., threaded rod) may engage with respective tie components. The overall length of the tie assembly may be adjusted via engagement (e.g., threaded) between the adjustment member and the tie component(s).

The inventors have appreciated that it would be advantageous for a tie assembly to be adjustable in length, not only prior to installation of the assembly into opposite sides of a concrete form, but also after installation. That is, once tie components in accordance with the present disclosure are suitably installed, with an adjustment member, as a complete tie assembly, the tension and/or slack of the tie assembly may be taken up, as desired.

As a result, the tie assembly may adjusted so as to bear more load, in tension, from the poured concrete than would otherwise be the case if the length adjustability were not possible. By taking up excess slack and, thus, limiting further displacement or deformation of the wall panel(s) on opposing sides, the tie assembly reduces the tendency for the wall panel(s) to sag or bow outwardly due to hydrostatic stresses arising from the pre-cured concrete.

In various embodiments, a portion of a tie component may be configured to rotate with respect to a complementary adjustment member, while the anchor end of the same tie component remains fixed (e.g., to a wall panel). Thus, certain portions of the tie component may rotate with respect to one another. Hence, when tie components are installed, for example, so as to be suitably anchored to opposing wall panels, despite the anchor ends of the tie components being fixed, the overall length of the tie assembly may still be adjusted (e.g., increased or decreased).

For example, swiveling portions of various embodiments of tie components may be rotated with respect to one another, so as to allow an adjustment member to move back and forth relative to the tie component(s). Accordingly, the overall length of the tie assembly may be reduced, allowing for extra slack to be taken up, as desired.

This is in contrast to conventional tie components where each tie component is provided as a single rigid part without any such swiveling ability. In such tie components, the adjustment member is typically moved back and forth (e.g., through screwed engagement with complementary threads) through space(s) defined by respective threaded coils of the tie components. That is, the conventional tie component is a single rigid body having an anchor end and an adjustment end. The anchor end may be firmly attached to a wall panel or other support structure; and the adjustment end may be placed in suitable engagement with an adjustment member. The adjustment member may, on one side, engage with the adjustment end of the tie component. And the adjustment member may, on an opposite side, engage with another tie component, or may itself be attached to a support structure.

During installation of a conventional tie assembly, the anchor end of a tie component is firmly affixed to a wall panel such that the entire tie component cannot be moved (e.g., rotated). One side of a threaded rod is then rotatably inserted into the adjustment end of the tie component. The threaded rod is then engaged, on the opposite side, with another tie component, which is, in turn, attached to an opposing wall panel. Or, the threaded rod itself is affixed to another wall panel or support structure, without engagement with another tie component. When both sides of a conventional tie assembly are fixed or otherwise installed into respective support structures (e.g., wall panel, rock face, etc.), the length of the assembly remains fixed, without the possibility for length adjustment thereof.

Though, tie components in accordance with the present disclosure include a swivel feature that permits rotation between coupled portions of the tie component. Such a swivel feature had not previously been present or otherwise available in conventional tie components. As discussed above, the length of a conventional tie assembly is adjustable prior to complete installation, though, when the conventional tie assembly is fully installed, the overall length of the tie assembly is unable to be adjusted. However, tie components described herein allow for the overall length of the tie assembly to be adjusted after having been installed into respective wall panels.

In some embodiments, a tie component includes a first portion that has an anchor end adapted to be fixed to a wall, and a swivel end located opposite the anchor end. The tie component also includes a second portion having an adjustment end adapted to engage with an adjustment member, and a swivel end located opposite the adjustment end. In some cases, tie components according to the present disclosure may also be described as swivel tie components, where the swivel end of the first portion and the swivel end of the second portion are rotatably coupled to one another.

Accordingly, embodiments of tie components described herein may be anchored to a first wall section (e.g., wall panel, rock face, support structure, etc.). An adjustment member may be coupled with (e.g., threaded, screwed into) an adjustment end of a tie component. A second tie component—swivel tie component or conventional tie component—may be anchored to a second wall section at a location spaced from the first wall section. The adjustment member may also be coupled to an adjustment end of the second tie component.

The adjustment member and the adjustment end of the swivel tie component may be rotated relative to one another (e.g., rotation of the adjustment member and/or the adjustment end of the tie component), so as to modify a position of the adjustment member between the swivel tie component and the second tie component. Thus, the overall length of the tie assembly may be adjusted while the tie components are fixedly anchored in place.

Figure 1B:
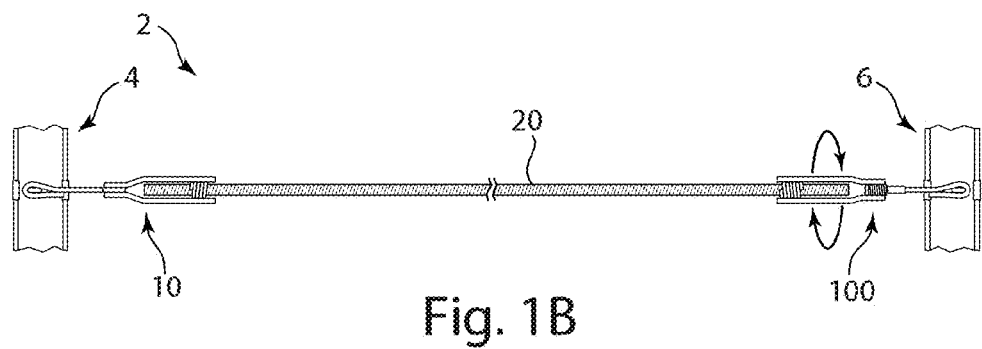

FIGS. 1A-1B show an illustrative embodiment of a tie assembly 2 including tie components 10, 100 each having anchor ends that are fixed to respective wall panels 4, 6 located opposite one another, for a concrete form. In this embodiment, the anchor ends are provided as loops, which may provide for a firm attachment to the wall panels 4, 6. Though, it can be appreciated that tie components in accordance with the present disclosure may have anchor ends that are structured in any suitable manner, some examples of which are provided further below.

The tie assembly 2 further includes an adjustment member 20, which is provided so as to engage with respective adjustment ends of each tie component. In some embodiments, the adjustment member 20 and the respective adjustment ends of the tie components 10, 100 have surfaces that are complementary to one another. For example, the adjustment member 20 may be a rod having a threaded surface and the adjustment ends of the tie components 10, 100 may include threaded coils for receiving the threaded surface at respective ends the adjustment member. That is, appropriate ends of the adjustment member 20 may be suitably screwed into corresponding adjustment ends of the tie components 10, 100.

While the adjustment member is depicted in this embodiment as a threaded rod, which complements threaded coils of the respective adjustment ends of the tie components, it can be appreciated that any suitable method of mutual engagement may be possible. For example, one or both ends of the adjustment member may include a threaded coil and the respective adjustment end(s) of one or both of the tie components may include a threaded rod having a surface complementary to the adjustment member.

It can also be appreciated that the adjustment member and/or adjustment end(s) of the tie component(s) are not required to be threaded. For instance, the adjustment member may have a relatively smooth surface (e.g., unthreaded) that may be appropriately sized so as to slide into a passageway provided by an adjustment end of a tie component. In some embodiments, upon suitable entry of the adjustment member into the adjustment end of the tie component, the adjustment end may be further configured to clamp down and hold the adjustment member in place.

Conversely, the adjustment end of the tie component may have a rod having a relatively smooth surface (e.g., unthreaded) and the adjustment member may have a passageway that accommodates entry of the adjustment end of the tie component therethrough. Accordingly, the overall length of the tie assembly may be adjusted, as appropriate and as desired. The adjustment member and/or the adjustment end of the tie component may have any appropriate structure suitable for maintaining the adjustment member and adjustment end of the tie component in place, such as, protruding tabs, snap/interference/friction fit structures, ribbed features, or any other suitable structures that are complementary to one another.

One of the tie components 10 shown in FIGS. 1A-1B is a conventional loop coil tie component. The other tie component 100 is a swivel tie component that includes a suitable swivel feature which allows two opposing ends of the tie component to be rotated with respect to one another, as shown by the curved arrow in FIG. 1B. By allowing portions of the tie component to swivel or otherwise rotate with respect to one another, the adjustment member 20 may be manipulated or moved back and forth appropriately between the tie components, even after both tie components are anchored to respective wall panels 4, 6.

Thus, after installation of the tie assembly 2, the overall length of the tie assembly may still be adjusted. That is, the length of the tie assembly may be modified, for example, from a longer length, as shown by the sagging assembly in FIG. 1A, to a comparatively shorter length, as shown in FIG. 1B. By such modification, it is possible to take up extra slack in the assembly. By taking up extra slack, the tie assembly is able to bear a greater amount of load, arising from the poured concrete, than would otherwise be the case. In contrast, when the tie assembly is allowed to sag, the wall panels on opposing sides bear a substantial brunt of the load. Here, by taking on an increased degree of load, the total amount of pressure that would otherwise be on the wall panels is alleviated.

Figure 2A:
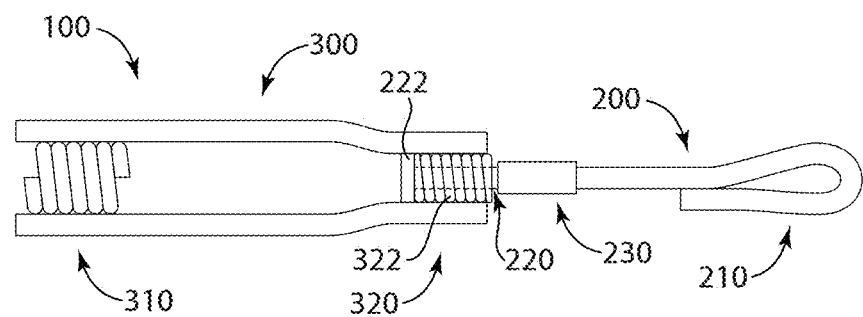
FIGS. 2A-2C show various views of a tie component in accordance with an embodiment.
Figure 2B:
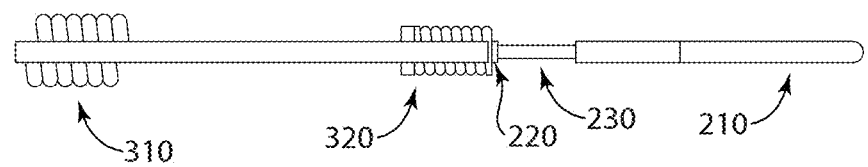
Figure 2C:
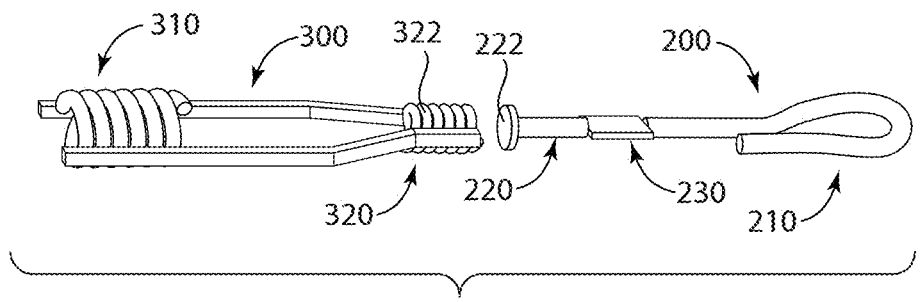

FIGS. 2A-2C illustrate an embodiment of a tie component 100 which includes two portions 200, 300 that may rotate relative to one another. The first portion 200 includes an anchor end 210, a swivel end 220 and a break region 230. As shown, the break region 230 is located between the anchor end 210 and the swivel end 220. The second portion 300 includes an adjustment end 310 and a swivel end 320. In various embodiments, these portions 200, 300 may be formed as separate pieces and, as shown, the respective swivel ends 220, 320 of the respective first and second portions 200, 300 are rotatably coupled in a manner so as to form a swiveling arrangement.

When suitably installed to an appropriate wall panel, the anchor end forms a strong attachment thereto. In this embodiment, the anchor end 210 is a loop anchor, having a loop through which a complementary anchoring structure (e.g., rigid peg, hook, etc.) may be placed. Such a complementary anchoring structure may be provided at the wall panel to which the anchor end is attached. While it may be helpful for holding the tie component in place, the use of an anchoring structure complementary to the loop anchor is not necessary for every embodiment of the present disclosure.

Figure 13:
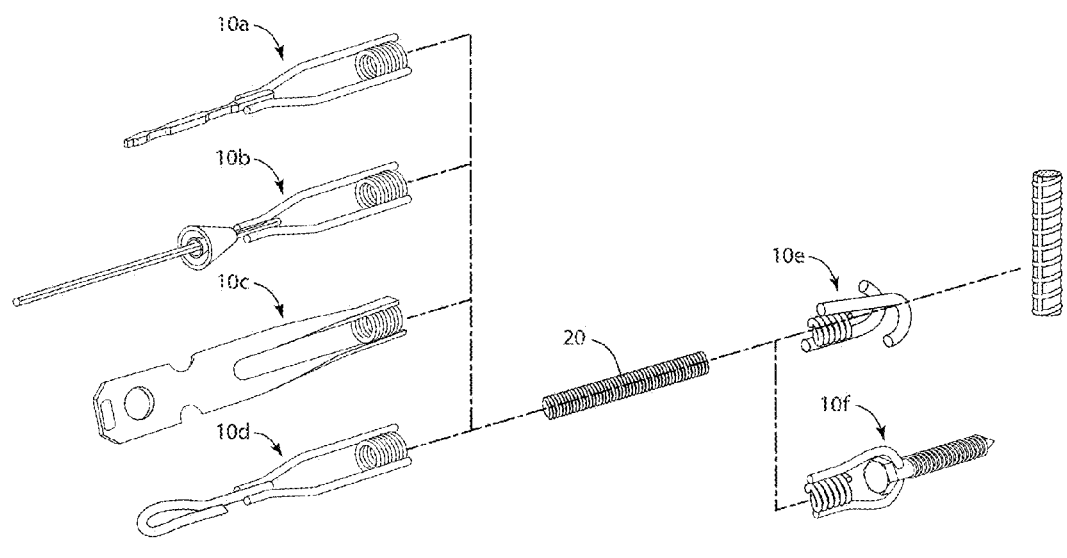
FIG. 13 illustrates various tie components in accordance with some embodiments.

The anchor end 210 may include any suitable structural configuration. For example, the anchor end 210 may include a hook, a T-shaped structure, a cap, flange, tabs, or any other appropriate feature for resisting removal of the tie component 100 from the wall. The anchor end 210 may include surface features that increase the overall friction that may arise between the wall panel. For example, such surface features may include protrusions, perforations, ribbed features, or other structure that may lead to an increase in the overall force that would be required to remove the tie component from the wall. In some embodiments, the anchor end 210 is provided as a rod-like extension of the tie component, without any additional feature(s) in particular. Various illustrative examples of suitable anchor ends for a tie component are depicted in FIG. 13.

The swivel end 220 of the first portion 200 may include a connecting rod 222 having an enlarged portion (e.g., flange) on the end for engaging and remaining coupled with a corresponding swivel end 320 of the second portion 300 of the tie component.

The break region 230 may be a thinned area (e.g., press stamped, rolled, etc.), located between the swivel end 220 and the anchor end 210, that facilitates breakage of the anchor end, or a substantial section thereof, from the tie assembly, after installation. That is, after the concrete has cured, and the tie assembly has served its purpose of withstanding the hydrostatic pressure that arises from the poured concrete, there is no further need for firm attachment of the tie components to respective wall sections. For instance, upon curing of the concrete, it may be preferable for the concrete to bear all, or substantially all, of the load applied to the wall panels, rather than components of the tie assembly.

In fact, at times, an intact tie assembly may interfere with other aspects of concrete forming, or subsequent building activity. Or, allowing the tie assembly to remain intact, and be unnecessarily load bearing, may lead to undesirable stress concentrations or other distributions within, or associated with, the wall. Accordingly, respective anchor ends may be appropriately removed (i.e., broken off) from the assembly.

Break regions of a tie component may be provided in any suitable manner. For example, break regions may be a flattened (e.g., thinned) region, a vee notch, a radial score, or other suitable feature, as known in the art. Break regions of a tie component may be located at any appropriate location. For instance, as shown in the figures, a break region may be located between the swivel end and the anchor end of a first portion of a tie component. Or, a break region may be located at a suitable location of the second portion of the tie component.

In some embodiments, break regions may serve additional purposes. For instance, as discussed further below, an end of the break region may be shaped so as to maintain an appropriate coupling between various portions of the tie component. Such a coupling may allow the tie component to swivel, while keeping coupled parts in suitable positions.

As noted above, the second portion 300 includes an adjustment end 310 and a swivel end 320. In this embodiment, the adjustment end 310 includes a threaded coil for receiving a threaded adjustment rod that may be manipulated (e.g., screwed, pushed, pulled, etc.) to move back and forth through the coil, allowing for length adjustment of the overall tie assembly.

As also discussed, such length adjustment of the tie assembly may be effective, for example, to prevent sagging or to take up slack of the assembly. It can be appreciated that any suitable structure other than a threaded coil may be used for the adjustment end 310 to receive the adjustment member. For example, the adjustment end 310 may include a tapped sleeve, slot, wound coil, nut, or other suitable part, as known in the art. The adjustment member may have a structure complementary to the adjustment end 310 of the tie component that allows for appropriate movement back and forth.

In some cases, the adjustment end may include a simple tube or conduit that permits a rod or other structure to move therethrough. In some embodiments, the adjustment end includes locking features located at various positions along its length that are optionally provided as stopping points for the adjustment member. An example of a locking feature may include a locking clamp that may be actuated so as to grip and hold the adjustment member in place so as to arrest movement of the adjustment member relative to the adjustment end. Another example of a locking feature may include a pin that may extend through a portion (e.g., wall) of the adjustment end so as to engage with the adjustment member, for example, via a hole or opening in a rod. Accordingly, the adjustment member may be prevented from moving freely back and forth when the pin of the tie component is inserted or pushed into a complementary hole thereof. When the pin is removed from the respective hole, the adjustment member may be permitted to move back and forth relative to the tie component.

As further shown in FIGS. 2A-2C, the swivel end 320 of the second portion 300 includes a receiving conduit 322, which may or may not be coiled, or threaded, and which defines a lumen within which a connecting rod 222 of the swivel end 220 of the first portion 200 may be positioned. In some embodiments, the connecting rod 222 and the receiving conduit 322 and hence, the first and second portions 200, 300, may be freely rotatable with respect to one another.

While, for some embodiments, the coupling between the connecting rod 222 and the receiving conduit 322 may provide free rotation of the first and second portions 200, 300 relative to one another (e.g., 360 degree rotation along a longitudinal axis that extends through the tie component), the coupling may also be constructed such that the first and second portions 200, 300 are substantially prevented from coming apart. In some embodiments, the first and second portions 200, 300 may include retaining features that hold the respective portions together. For example, the first portion 200 may include one or more barriers located on opposite sides of the receiving conduit 322 of the second portion 300 that are too large to slide or otherwise move therethrough. Accordingly, the first and second portions 200, 300 may be rotatably attached, yet constrained from movement apart from, or toward, one another.

In this embodiment, as discussed above, the first portion 200 may include a flange (e.g., similar to the head of a nail) at the end of the connecting rod 222, located on one side of the conduit 322. The flange may be formed as a rim having an outer diameter that is greater than the diameter of the lumen defined by the inner wall of the conduit 322 of the second portion 300. That is, while a portion of the connecting rod 222 may be small enough to slide or otherwise be situated within the lumen of the conduit 322, the flange at the end of the connecting rod 222 may be too large to move through the lumen of the conduit 222, preventing separation of the first and second portions 200, 300.

On the other side of the conduit 322, similar to the flange of the connecting rod 222, the end 232 of the break region 230 of the first portion 200, that is closest to the conduit 322, may have a shape that prevents movement of the break region 230 through the lumen of the conduit 222. For example, the end 232 of the break region 230 may have a cross-sectional thickness or width that is greater than the diameter of the lumen defined by the inner wall of the conduit 322 of the second portion 300.

Referring to FIGS. 2A-2B, when the first portion 200 is pulled toward the right, or when the second portion 300 is pulled toward the left, the flange of the connecting rod 222 contacts the end of the conduit 322 (i.e., shown on the left of the conduit 322, closest to the flange). This contact impedes any further movement of the first and second portions 200, 300 in respective directions, away from one another.

And when the first portion 200 is pushed toward the left, or when the second portion 300 is pushed toward the right, the end 232 of the break region 230 contacts the end of the conduit 322 (i.e., shown on the right of the conduit 322, closest to the break region 230). This contact impedes any further movement of the first and second portions 200, 300 in respective directions, toward one another. As a result, the first and second portions 200, 300 may be fixed in position with respect to one another, yet also arranged to have a swiveling configuration.

In some embodiments, the coupling arrangement between the first and second portions 200, 300 may include additional components, such as washers or other joint connection structure(s). For example (not shown in the figures), a washer may be included between the flange of the connecting rod 222 and the end of the conduit 322 to which the flange encounters, or a washer may be included between the end 232 of the break region 230 and the other end of the conduit 322. The washer(s), or other connection structure(s), may be preferable so as to limit excessive contact between various surfaces of the first and second portions 200, 300, which may otherwise lead to undesirable stresses or friction. For example, such connection structure(s) may help to distribute load to the sleeve or coil part of the component.

While it is possible that the connecting rod 222 and the receiving conduit 322 may be constructed to so as to be able to engage with one another, such as in an optional screw-type arrangement (e.g., threaded rod and complementary threaded coil), in the example shown in FIGS. 2A-2C, the connecting rod is unthreaded and rotates freely within the space defined by the receiving conduit.

In some embodiments, the receiving conduit may be an unthreaded tube/sleeve, a stamped component, a molded part made from plastic/metal or an extrusion process, or other suitable part, as known in the art. In various embodiments, the tie component may incorporate a left- or right-handed thread turnbuckle arrangement.

In some embodiments, the adjustment end 310 and the swivel end 320 of the second portion 300 may both be threaded, having a similar or different pitch. It can be appreciated that threaded components may exhibit any suitable pitch and hand (e.g., left-handed, right-handed, etc.). For example, the pitch of a threaded coil adjustment end may be more dense (i.e., greater rate), or less dense, than the pitch of a threaded coil swivel end.

When an appropriate adjustment rod is suitably engaged with the adjustment end 310 of the second portion 300, turning the tie component with respect to the adjustment rod may bring the rod further in to or out of the tie component, depending on the type of threading. Such manipulation may serve to adjust the overall length of the tie assembly, in accordance with the differential in thread pitch.

While the tie component 100 of FIGS. 2A-2C includes two portions 200, 300 that may be formed as separate parts, yet coupled to one another, it can be appreciated that tie components in accordance with the present disclosure are not required to have two separate parts. For example, tie components of the present disclosure may include one monolithic part formed as a single-piece component that includes an anchor portion and an adjustment portion, similar to anchor end 210 and adjustment end 310, as described herein. Such a part may include a swivel feature, as discussed herein. Alternatively, tie components of the present disclosure may include more than two parts that are independently formed.

Figure 3:
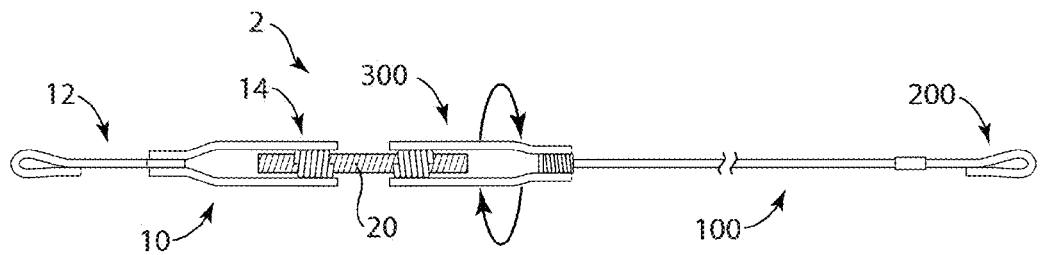
FIG. 3 illustrates a tie assembly in accordance with an embodiment.

FIG. 3 depicts an example of a loop coil tie assembly that includes a standard coil tie component 10 (e.g., Standard LC-6 loop coil transition tie, as known in the art), a swivel tie component 100 and a threaded adjustment rod 20 located in between and coupled to each tie component. In the standard coil tie component 10, the anchor end 12 and the adjustment end 14 are rigidly fixed with respect to one another, without a swiveling or otherwise adjustable feature between the two ends. The swivel tie component 100, on the other hand, has ends that are rotatable with respect to one another, as described herein.

The adjustment rod may be screwed into each of the threaded adjustment coils of the standard coil tie component 10 and the swivel tie component 100. Even if the respective anchor ends of the standard coil tie component 10 and swivel tie component 100 are fixed, the position of the adjustment rod, at least with respect to the swivel tie component may be easily modified by rotating the second portion 300 with respect to the first portion 200 of the swivel tie component 100. That is, due to the swiveling capability of the swivel tie component 100, the adjustment rod 20 may effectively be moved back and forth along the adjustment end of the swivel tie component 100, so as to length or shorten the tie assembly.

It can be appreciated that the tie components may have any suitable length appropriate for the overall tie assembly, depending on the space desired between wall panels. As shown in FIG. 3, the swivel tie component 100 has a length that is greater than the length of the standard coil tie component 10. Though, in some embodiments, the length of the standard coil tie component 10 may be greater than or equal to the length of the swivel tie component 100.

Figure 4A:
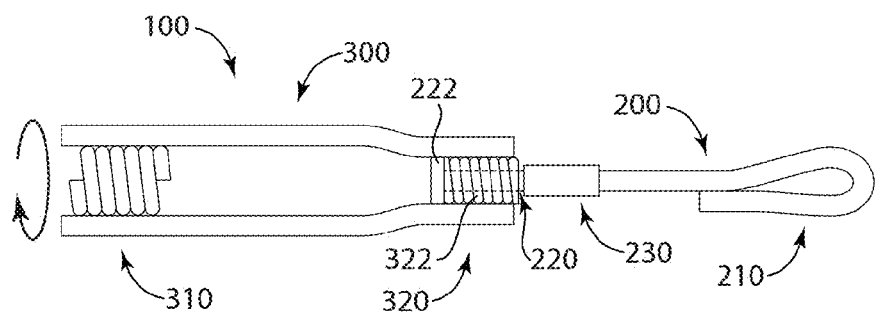
FIGS. 4A-4D depict side views of various tie components in accordance with some embodiments.
Figure 4B:
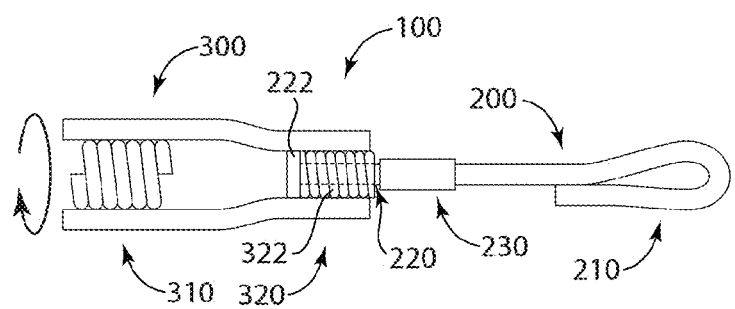

A number of different types of tie components may be formed, depending on the application. FIGS. 4A-4D illustrate more examples of swivel tie components in accordance with the present disclosure. For instance, such tie components may be formed to exhibit any appropriate dimensions. As shown, the tie components of FIGS. 4A and 4B each include a coiled adjustment end 310 that rotates relative to the loop anchor end 210; though, the tie component of FIG. 4A is longer than the tie component of FIG. 4B, each suitable for the appropriate application(s).

Figure 4C:
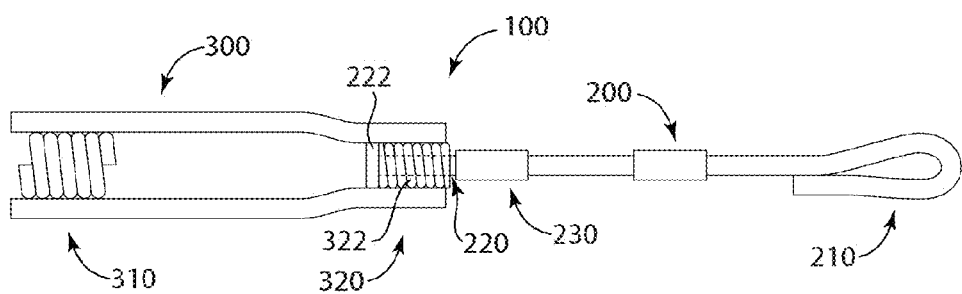
Figure 4D:
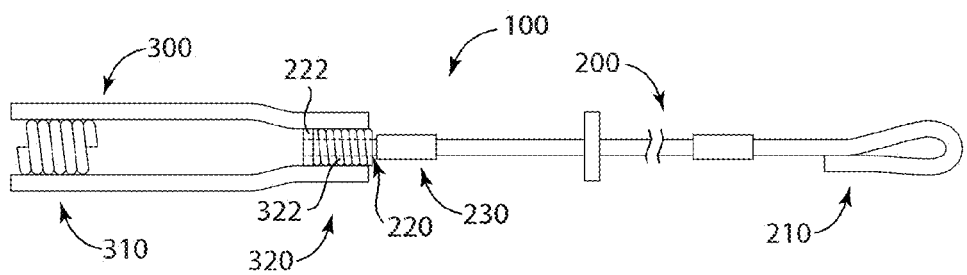

Swivel tie components shown in FIGS. 4C-4D include a number of break regions 230a, 230b, which may be appropriate for certain uses. That is, upon installation, it may be preferable for the tie assembly to be able to break at certain locations along its length. For example, in a relatively long tie component, it may be possible for undesirable stress concentrations to arise at various locations along the tie component. Accordingly, the tie component may include a number of break regions along its length.

Figure 5A:
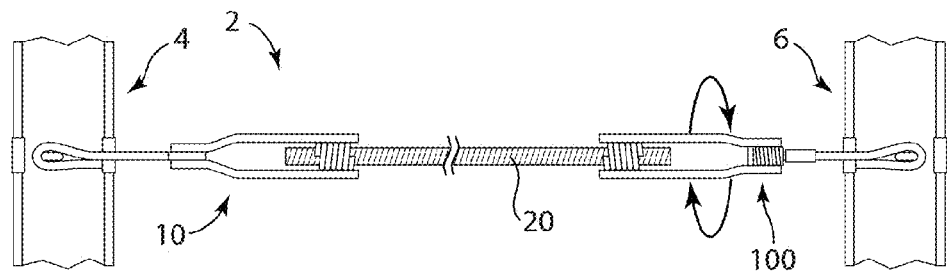
FIGS. 5A-5C show various tie assemblies in accordance with some embodiments.
Figure 5B:
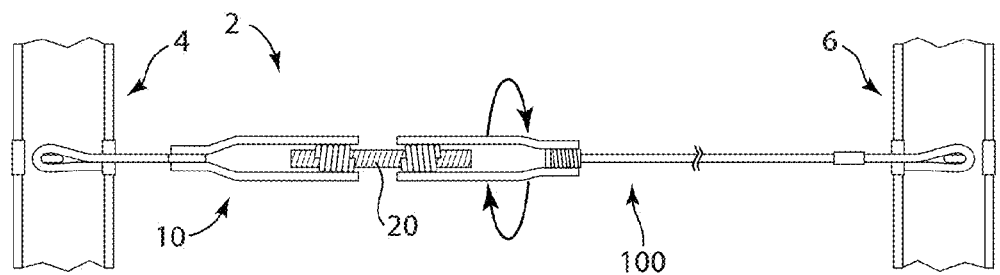
Figure 5C:
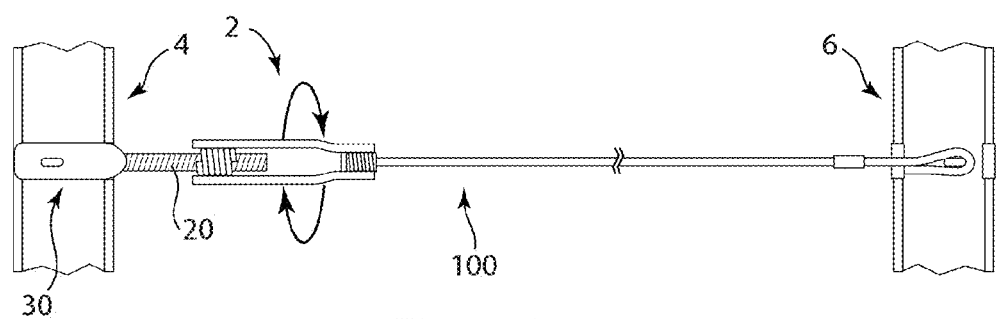

FIGS. 5A-5C depict various illustrative embodiments of tie assemblies 2 that are installed in wall panels 4, 6 located opposite one another. The particular tie components employed in each of the embodiments differ, yet serve a similar purpose in that the overall length of the tie assembly is adjustable after installation thereof. Depending on the nature of the tie assembly and, for example, the type of tie component employed on one side, the swivel tie component may be appropriately chosen.

In FIGS. 5A and 5B, one end of the assembly 2 includes a standard coil tie component 10, yet the other end includes a swivel tie component 100. FIG. 5A shows an assembly similar to that shown in FIGS. 1A-1B where the a standard coil tie component 10 and the swivel tie component 100 are relatively similar in length, yet the adjustment rod 20 has a length (e.g., longneck) substantially greater than either of the tie components 10, 100. FIG. 5B, on the other hand, depicts an assembly similar to that shown in FIG. 3 where the swivel tie component 100 is substantially longer than each of the standard coil tie component 10 and the adjustment rod 20.

In FIG. 5C, rather than a standard coil tie component, one end of the assembly includes a standard plylag 30, and the opposite end of the assembly 2 includes a swivel tie component 100 in accordance with embodiments described herein. Here, the plylag 30 includes both an anchor for the wall panel 4 and an adjustment rod 20, for engagement with the swivel tie component 100. In contrast with the assemblies of FIGS. 5A-5B, which have three total components in the assembly, the assembly of FIG. 5C includes only two components.

In each instance shown in FIGS. 5A-5C, after installation into respective wall panels 4, 6, the adjustment end of the swivel tie component (e.g., second portion) may be rotated so as to modify the position of the adjustment rod 20 with respect to the swivel tie component. Accordingly, the overall length of the tie assembly is suitably adjusted.

Figure 6A:
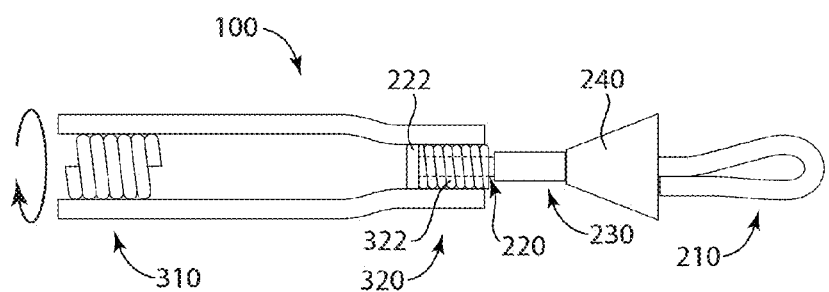
FIGS. 6A-6B illustrate side views of various tie components in accordance with some embodiments.
Figure 6B:
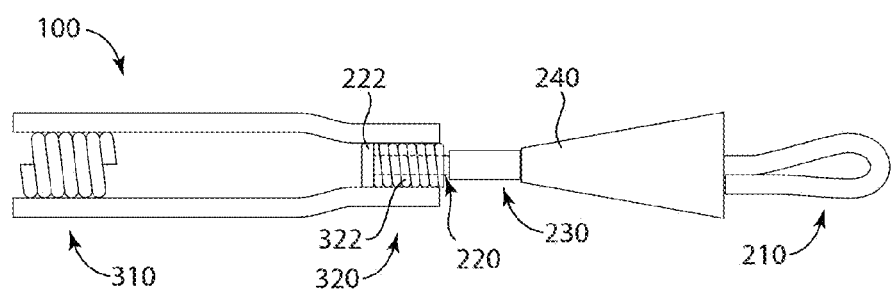

FIGS. 6A-6B show more illustrative embodiments of swivel tie components 100, which also include a support member 240 that surrounds a region of the first portion 200, which assists overall alignment of the tie component with the wall panel. The support member 240 may have any suitable shape, for example, frustoconical, cone, cylinder, etc. In various embodiments, and as shown, the support member 240 has a shape that is flared (e.g., tapers outward) from the break region 230 to the anchor end 210. For example, as shown, one end of the support member 240 is located adjacent the break region 230 and substantially conforms to the shape and size of the neck of the first portion 200, and the other end of the support member 240 has a comparatively larger cross-sectional area and is arranged so that, upon installation, this end of the support member comes into substantially flush contact with the surface of a wall panel.

Upon installation, or anchoring, to a wall, the support member 240 presses up against the surface of the wall (e.g., a relatively flat wall panel). Thus, the support member 240 is able to provide appropriate support and orientation for the tie component. In some cases, the support member 240 may assist in maintaining a particular orientation of the tie component 100, so that the support member extends in a direction that is substantially perpendicular with respect to the surface of the wall.

In some embodiments, the support member 240 may provide a covering for the neck of the first portion 200 of the tie component, up to the break region 230. Thus, the support member 240 may serve as an indicator for where the break region 230 of the tie component is located. The support member may also provide a suitable amount of protection for the tie component. In some cases, the support member 240 may aid in the removal of the portion of the tie component when it is broken back into the concrete, for example, 1-2 inches from the face of the wall. The support member may act as a sleeve to prevent concrete from adhering to the portion of the tie component that is broken off by twisting. The support member may also provide a convenient depression (e.g., conical in shape) in the wall that can later be filled with grout to seal the end of the broken tie component that remains lodged within the finished concrete wall. As shown in FIGS. 6A-6B, support members of varying sizes and shapes, as appropriate, may be employed.

Tie assemblies may extend between any appropriate type of wall(s). Walls may be generally smooth surfaces, such as typical wall panels (e.g., wooden, steel, etc.). Alternatively, walls may have inconsistent surface patterns, such as those found in rock faces or other irregular surfaces. Accordingly, tie assemblies may be used for one-sided or two-sided forming.

Figure 7:
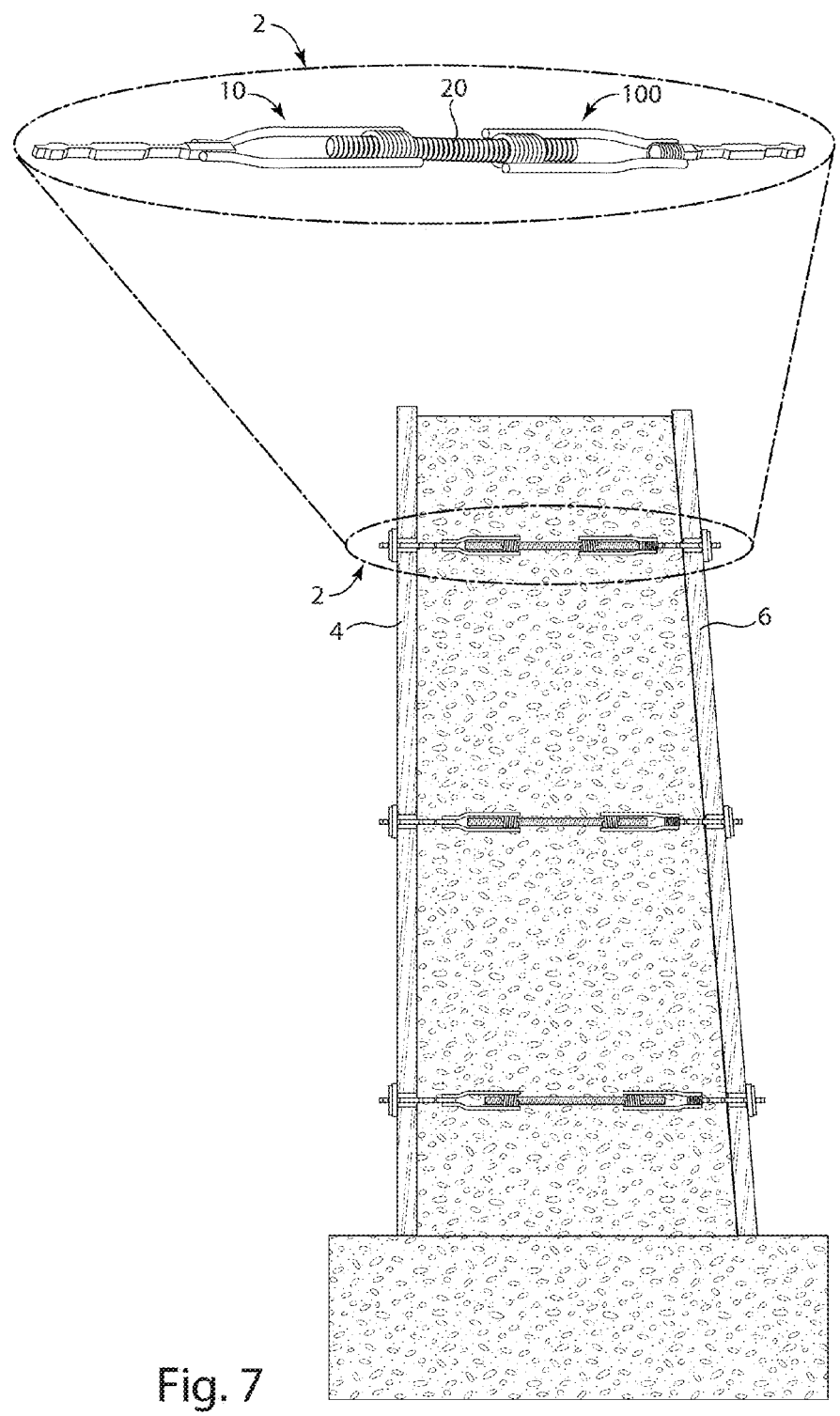
FIG. 7 shows various tie assemblies engaged with a wall in accordance with some embodiments.

For instance, FIG. 7 depicts an example where a standard coil tie component 10 (e.g., Resi-Coil transition tie, as known in the art) is provided on one side of a threaded adjustment rod 20 and a swivel tie component 100 is provided on the other side of the threaded adjustment rod 20, for two-sided forming. Here, two relatively smooth wall panels 4, 6 with which the standard coil tie component 10 and swivel tie component 100 engage are located opposite one another. After anchoring of the tie components 10, 100 into the respective wall panels 4, 6, due to the ability for the swivel tie component 100 to be able to rotate, the overall length of the tie assembly may be adjusted prior to pouring of the pre-cured concrete.

Figure 8:
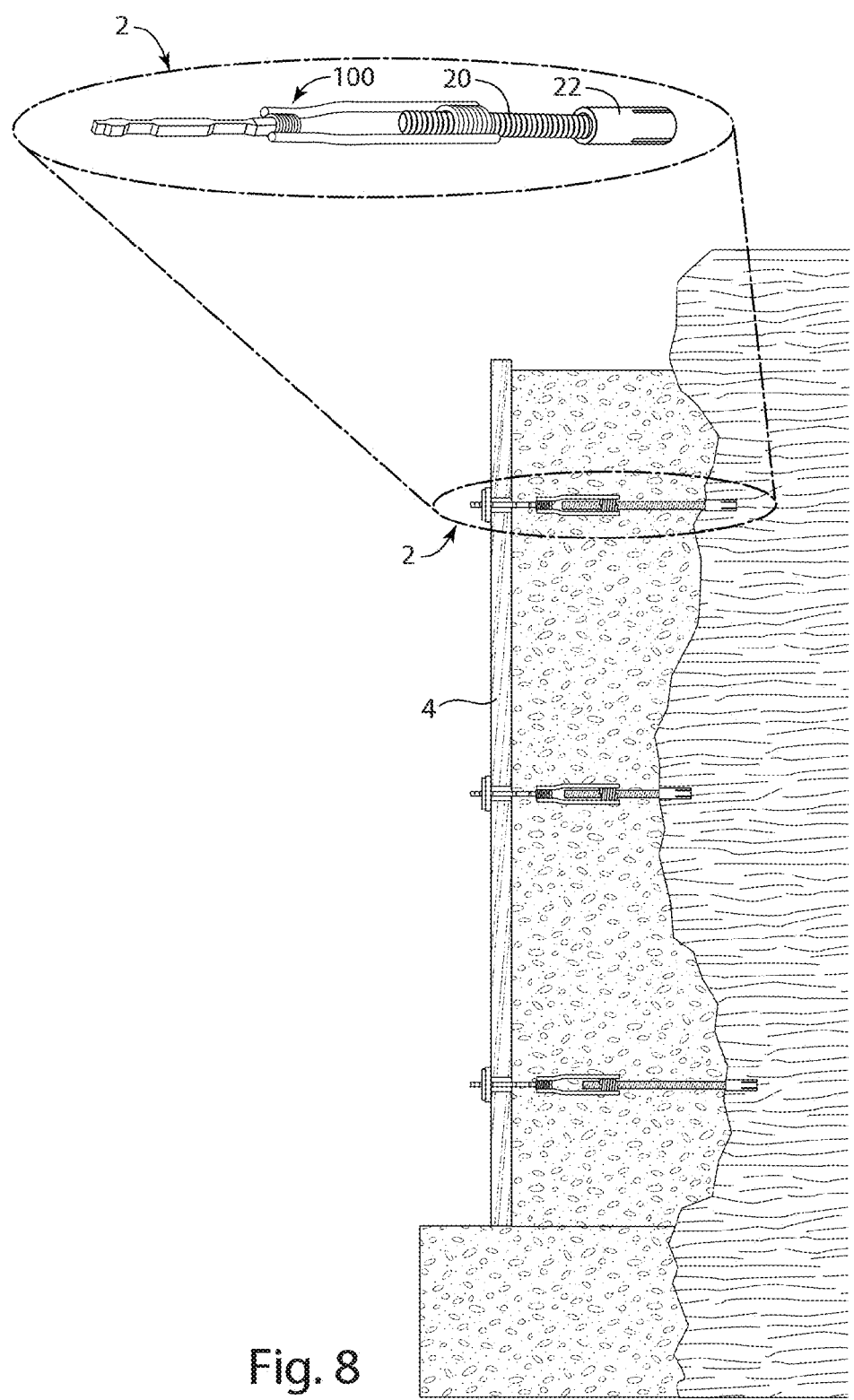
FIG. 8 depicts various tie assemblies engaged with another wall in accordance with some embodiments

FIG. 8 shows an example where a single tie component 100 is used in combination with a rock anchor 22 that has a threaded adjustment rod 20 built in, for one-sided forming. In this embodiment, the tie component 100 is a swivel tie component. As shown, one relatively smooth wall panel 4 is located opposite an irregularly shaped rock face. The swivel tie component 10 is latched to the wall panel 4 and the rock anchor 22 is embedded in the irregularly shaped rock face.

It can be appreciated that tie components (e.g., swivel tie components) in accordance with the present disclosure may be appropriately utilized in any of the applications described herein, replacing or used in combination with standard tie components and anchors. For example, as shown, a swivel tie component may be employed in combination with the two-sided forming system of FIG. 7, or the one-sided forming system of FIG. 8.

Tie assemblies in accordance with the present disclosure may be oriented in any suitable manner between wall panels. For instance, it is not required for a tie assembly to extend between wall panels so as to be perpendicular with respective surfaces thereof. That is, a suitable tie assembly, and tie component(s) thereof, may extend in a direction that is angled with respect to the wall panel(s).

Figure 9A:
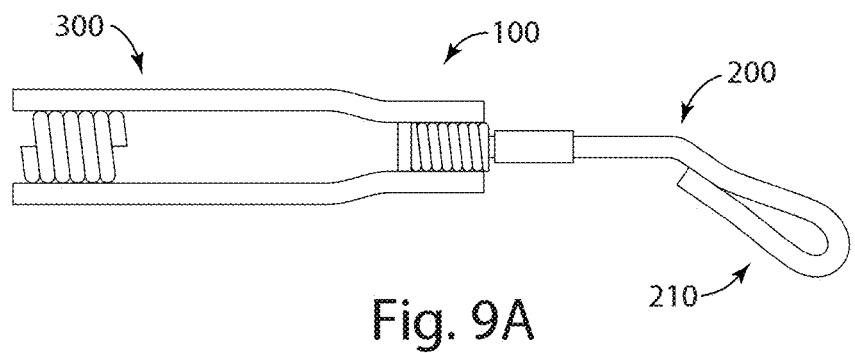
FIGS. 9A-9B show various views of a tie component in accordance with an embodiment.
Figure 9B:
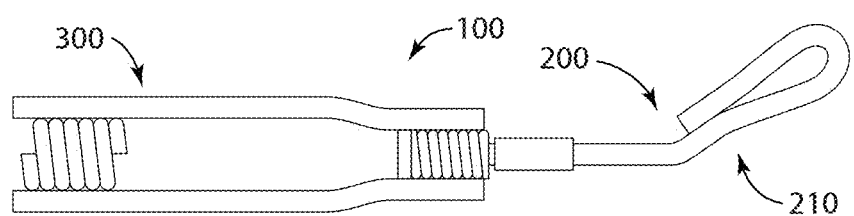

FIGS. 9A-9B depict illustrative embodiments of swivel tie components 100 that are constructed to extend at an angle with respect to the respective wall panel to which the tie component is anchored. For example, the anchor end 210 of the tie component 100 may be bent or angled with respect to the longitudinal axis about which the first and second portions 200, 300 swivel. Tie components described herein may exhibit any suitable bent or angled configuration, to any suitable degree, depending on the desired orientation of the tie assembly with respect to the wall panel(s). As shown in FIGS. 9A-9B, the respective tie components have anchor ends 210 that are bent approximately 30 degrees from the longitudinal axis of the tie component 100.

Figure 10:
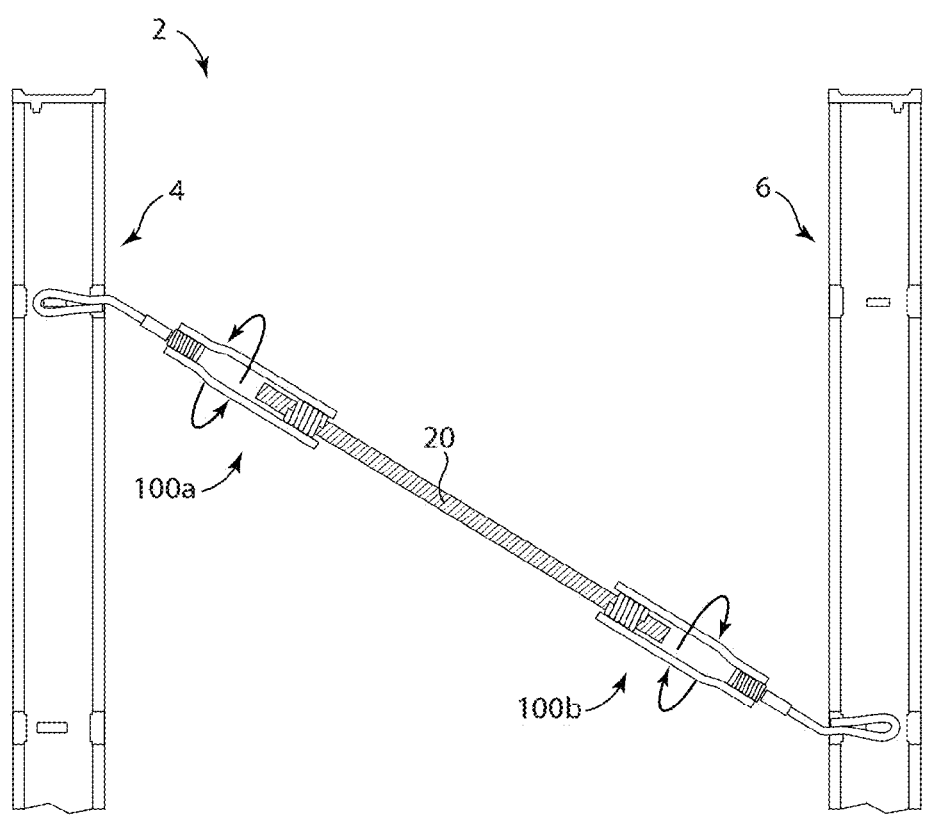
FIGS. 10-12 depict various tie assemblies in accordance with some embodiments.

FIG. 10 shows an illustrative embodiment of an installed tie assembly 2 that extends at an angle from a location on one wall panel 4 to a location of an opposing wall panel 6. As shown, the tie component 100a is anchored to the wall panel 4 at a location that is vertically higher than the location where the tie component 100b is anchored to the wall panel 6. As further illustrated, swivel tie components 100a, 100b are located at both ends of the tie assembly. Accordingly, the overall length of the assembly may be adjusted by appropriately swiveling portions of either tie component 100a, 100b.

Figure 11:
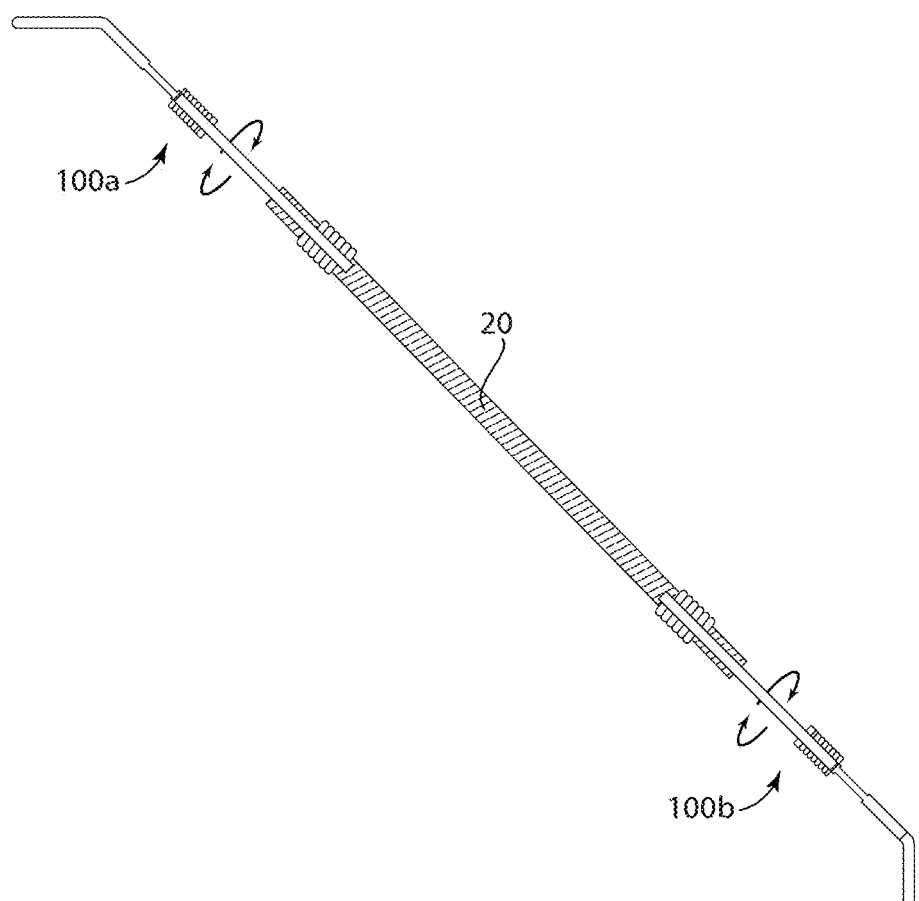
Figure 12:
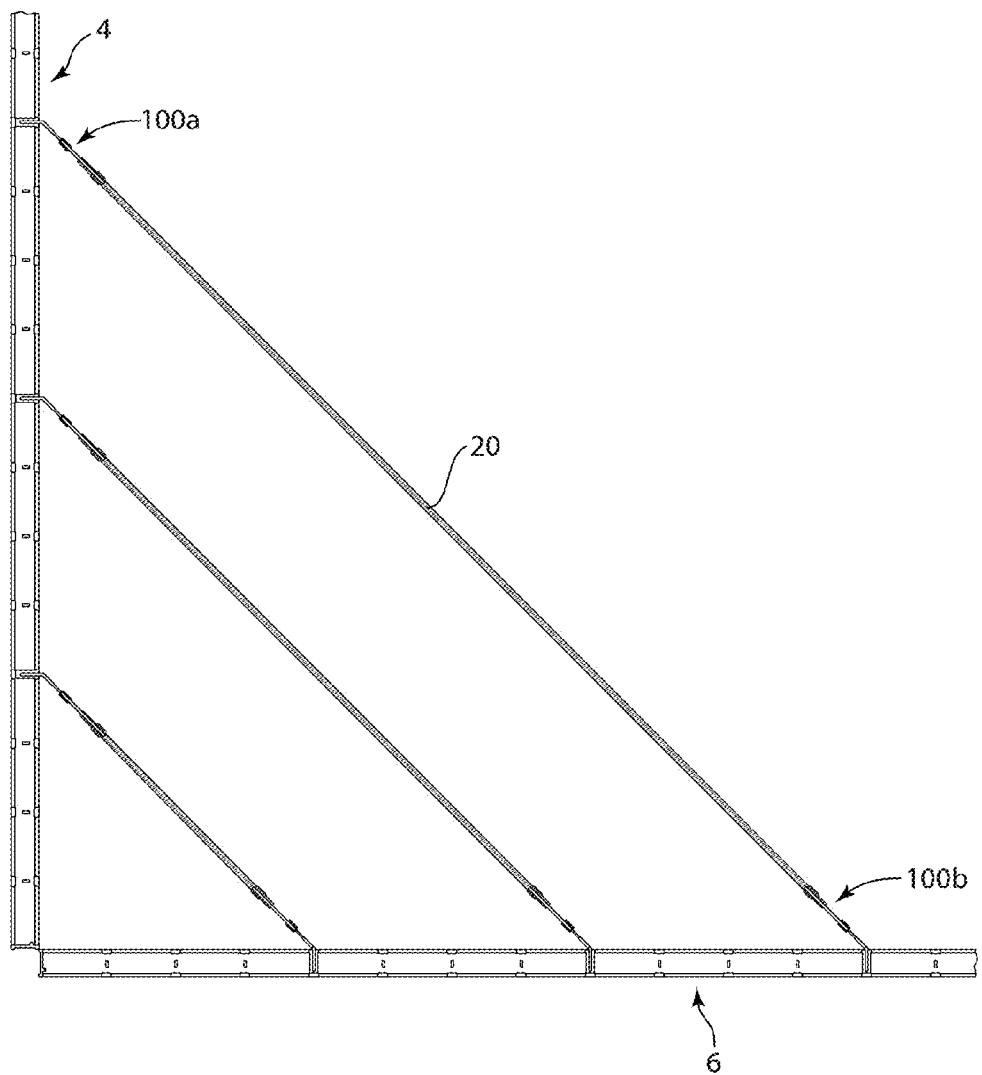

In addition, wall panels between which tie assemblies described herein are installed may exhibit any appropriate orientation, such as being angled, perpendicular or parallel with respect to one another. FIGS. 11-12 depict illustrative embodiments of tie assemblies that extend from wall panels, where the wall panels are positioned perpendicular to one another. Accordingly, in some embodiments, the swivel tie components 100a, 100b may have bent anchor ends that are installed into respective wall panels 4, 6 that are perpendicularly positioned.

As shown, the tie components 100a, 100b extend from the wall panels 4, 6 at appropriate angles. As further shown, an adjustment member 20 is rotatably coupled to respective adjustment ends of corresponding swivel tie components 100a, 100b so as to form a tie assembly. FIG. 12 depicts the tie assemblies to be substantially straight, where the length of the overall tie assembly is adjusted such that most of the extra slack is taken up. This is in contrast with other systems where the length of the tie assembly may be longer so as to result in sagging of the tie assembly.

Any suitable anchor end arrangement may be incorporated in tie components according to the present disclosure. As discussed above, tie components may include, for example, a loop anchor, or any other suitable anchoring feature. Those of skill in the art will appreciate that, for some embodiments, anchoring features may include, or be used in conjunction with those produced under the trade name STEEL DOG®, for example, components such as, or similar to, Resi-Coil Tie (RC), Snap-Coil Tie (SC), Aluma-Coil Tie (AC-6), Loop-Coil Tie (LC), or other transition ties as commercially used.

FIG. 13 illustrates a number of different types of conventional tie components 10a, 10b, 10c, 10d, 10e, 10f that may be replaced or used in combination with tie components according to the present disclosure. For example, the anchor end may be suitable for forming a fixed attachment to a wall panel, irregular face or other building material. The adjustment end may be appropriate for engaging with a complementary adjustment member (e.g., threaded rod), for adjusting the length of the overall tie assembly. Though, in accordance with embodiments described herein, the anchor end and the adjustment end may be rotatable with respect to one another, via a swiveling arrangement, as discussed above.

Tie assemblies in accordance with the present disclosure may be installed and adjusted in any appropriate manner. For example, referring back to FIGS. 1A-1B, a first tie component 100 may be anchored to one wall panel 6, for example, at an anchor end of the tie component 100. In this example, the first tie component 100 is a swivel tie component where coupled portions of the tie component are configured to rotate with respect to one another. It can be appreciated that the tie component may be formed as a separate parts or as a single unitary part. As discussed above for various illustrative embodiments, a first portion of the tie component includes the anchor end (e.g., loop anchor) and a second portion of the tie component includes an adjustment end (e.g., threaded coil/conduit).

In this embodiment, an end of the threaded adjustment rod 20 enters through a portion of the threaded coil adjustment end of the first tie component 100. In general, the adjustment member 20 and the adjustment end of the first tie component 100 may have complementary structures that allow for mutual engagement thereof. For example, the threaded adjustment rod 20 may be screwed into the threaded coil adjustment end of the first tie component 100.

A second tie component 10 may be anchored to an opposite wall 4, for example, at another suitable anchor end of the tie component 10. As shown in this illustrative embodiment, the second tie component 10 is a standard loop coil tie component that is rigidly formed as a single unitary part, which is unable to swivel. The adjustment end of the second tie component 10 may have a structure (e.g., threaded conduit) that is complementary to the adjustment member 20. For example, the opposite end of the threaded adjustment rod 20 may be screwed into the threaded coil adjustment end of the second tie component 10.

Once the two tie components are anchored, the anchor ends themselves are fixed in place at their respective wall panels. Though, because the first tie component 100 is able to swivel, the adjustment member and the adjustment end of the first tie component 100 may be rotated relative to one another (e.g., by rotating the adjustment end of the tie component relative to the anchor end). Such manipulation may result in effective modification of the position of the adjustment member between the first tie component and the second tie component. For example, as shown, the adjustment end of the first tie component 100 may be rotated so as to cause the adjustment member 20 to be screwed further into the adjustment end of the first tie component 100. Such manipulation may reduce the overall length of the tie assembly, as shown in FIG. 1B, taking up extra slack. Alternatively, more slack may be created by screwing the adjustment member 20 further out of the adjustment end of the first tie component 100.

It should be understood that the foregoing description is intended merely to be illustrative thereof and that other embodiments, modifications, and equivalents are within the scope of the present disclosure recited in the claims appended hereto. Further, although each embodiment described above includes certain features, the present disclosure is not limited in this respect. Thus, one or more of the above-described or other features or methods of use, may be employed singularly or in any suitable combination, as the present disclosure and the claims are not limited to a specific embodiment.

What is claimed is:

1. A tie component, comprising:
    a first portion having an anchor end adapted to be fixed to a wall section and a swivel end located opposite the anchor end; and
    a second portion having an adjustment end adapted to engage with an adjustment member and a swivel end located opposite the adjustment end, wherein the swivel end of the first portion and the swivel end of the second portion are constructed and arranged to swivel freely with respect to one another, wherein the adjustment end includes a threaded coil and the adjustment member comprises a threaded rod constructed and arranged to engage with the threaded coil such that, upon rotation of the threaded rod with respect to the threaded coil, the threaded rod moves through a lumen defined by the threaded coil.

2. The component of claim 1, wherein the swivel end of one of the first and second portions comprises a receiving conduit.

3. The component of claim 2, wherein the receiving conduit comprises a coil.

4. The component of claim 2, wherein the swivel end of the other of the first and second portions comprises a connecting rod constructed and arranged to be positioned within a lumen defined by the receiving conduit.

5. The component of claim 4, wherein the connecting rod and the receiving conduit are constructed and arranged to rotate freely with respect to one another.

6. The component of claim 5, wherein the connecting rod is unthreaded.

7. The component of claim 4, wherein the swivel end of the first portion comprises the connecting rod and the swivel end of the second portion comprises the receiving conduit.

8. The component of claim 1, wherein a break region of the anchor end is constructed and arranged to be broken after installation of the tie component with the wall section.

9. The component of claim 8, wherein the break region includes a thinned portion of the anchor end.

10. The component of claim 8, wherein the break region comprises a break back region, a vee notch, or a radial scoring.

11. The component of claim 1, wherein the anchor end comprises a loop end, a bent end, a button-head end, a button tie end, a loop tie end, an aluminum form tie end, a resi-panel tie end, or a snap tie end.

12. The component of claim 1, further comprising a cone disposed adjacent to the swivel end of the first portion.

13. A method of adjusting a tie assembly, comprising:
    anchoring a first tie component to a first wall section, the first tie component having opposing ends configured to swivel freely with respect to one another;
    coupling a first end of an adjustment member to an adjustment end of the first tie component, wherein the adjustment end of the first tie component comprises a threaded coil and the adjustment member comprises a threaded rod;
    anchoring a second tie component to a second wall section at a location spaced from the first wall section;
    coupling a second end of the adjustment member to an adjustment end of the second tie component; and
    rotating the adjustment member relative to the adjustment end of the first tie component to modify a position of the adjustment member between the first tie component and the second tie component.

14. The method of claim 13, wherein rotating the adjustment member with respect to the adjustment end of the first tie component comprises engaging the threaded rod with the threaded coil and moving the threaded rod through a lumen defined by the threaded coil.

15. The method of claim 13, wherein rotating the adjustment member with respect to the adjustment end of first tie component occurs after the first tie component is anchored to the first wall section and the second tie component is anchored to the second wall section.

16. The method of claim 13, wherein rotating the adjustment member relative to the adjustment end of the first tie component comprises adjusting a length of the tie assembly.

17. The method of claim 16, wherein adjusting a length of the tie assembly comprises reducing the length of the tie assembly.

18. A tie component, comprising:
a first portion having an anchor end adapted to be fixed to a wall section and a swivel end located opposite the anchor end; and
a second portion having an adjustment end adapted to engage with an adjustment member and a swivel end located opposite the adjustment end, wherein the swivel end of the first portion and the swivel end of the second portion are constructed and arranged to swivel freely with respect to one another, wherein the swivel end of one of the first and second portions comprises a receiving conduit comprising a coil.

19. The component of claim 18, wherein the adjustment end comprises a threaded coil, a wound coil, a tapped nut, or a sleeve.

20. The component of claim 19, wherein the adjustment end includes a threaded coil and the adjustment member comprises a threaded rod constructed and arranged to engage with the threaded coil such that, upon rotation of the threaded rod with respect to the threaded coil, the threaded rod moves through a lumen defined by the threaded coil.

21. The component of claim 18, wherein the swivel end of the other of the first and second portions comprises a connecting rod constructed and arranged to be positioned within a lumen defined by the receiving conduit.

22. The component of claim 21, wherein the connecting rod and the receiving conduit are constructed and arranged to rotate freely with respect to one another.

23. The component of claim 22, wherein the connecting rod is unthreaded.

24. The component of claim 21, wherein the swivel end of the first portion comprises the connecting rod and the swivel end of the second portion comprises the receiving conduit.

25. The component of claim 18, wherein a break region of the anchor end is constructed and arranged to be broken after installation of the tie component with the wall section.

26. The component of claim 25, wherein the break region includes a thinned portion of the anchor end.

27. The component of claim 25, wherein the break region comprises a break back region, a vee notch, or a radial scoring.

28. The component of claim 18, wherein the anchor end comprises a loop end, a bent end, a button-head end, a button tie end, a loop tie end, an aluminum form tie end, a resi-panel tie end, or a snap tie end.

29. The component of claim 18, further comprising a cone disposed adjacent to the swivel end of the first portion.

30. A tie component, comprising:
a first portion having an anchor end adapted to be fixed to a wall section and a swivel end located opposite the anchor end; and
a second portion having an adjustment end adapted to engage with an adjustment member and a swivel end located opposite the adjustment end, wherein the swivel end of the first portion and the swivel end of the second portion are constructed and arranged to swivel freely with respect to one another, wherein a break region including a thinned portion of the anchor end is constructed and arranged to be broken after installation of the tie component with the wall section.

31. The component of claim 30, wherein the adjustment end comprises a threaded coil, a wound coil, a tapped nut, or a sleeve.

32. The component of claim 31, wherein the adjustment end includes a threaded coil and the adjustment member comprises a threaded rod constructed and arranged to engage with the threaded coil such that, upon rotation of the threaded rod with respect to the threaded coil, the threaded rod moves through a lumen defined by the threaded coil.

33. The component of claim 30, wherein the swivel end of one of the first and second portions comprises a receiving conduit.

34. The component of claim 33, wherein the receiving conduit comprises a coil.

35. The component of claim 33, wherein the swivel end of the other of the first and second portions comprises a connecting rod constructed and arranged to be positioned within a lumen defined by the receiving conduit.

36. The component of claim 35, wherein the connecting rod and the receiving conduit are constructed and arranged to rotate freely with respect to one another.

37. The component of claim 36, wherein the connecting rod is unthreaded.

38. The component of claim 35, wherein the swivel end of the first portion comprises the connecting rod and the swivel end of the second portion comprises the receiving conduit.

39. The component of claim 30, wherein the anchor end comprises a loop end, a bent end, a button-head end, a button tie end, a loop tie end, an aluminum form tie end, a resi-panel tie end, or a snap tie end.

40. The component of claim 30, further comprising a cone disposed adjacent to the swivel end of the first portion.

41. A tie component, comprising:
a first portion having an anchor end adapted to be fixed to a wall section and a swivel end located opposite the anchor end; and
a second portion having an adjustment end adapted to engage with an adjustment member and a swivel end located opposite the adjustment end, wherein the swivel end of the first portion and the swivel end of the second portion are constructed and arranged to swivel freely with respect to one another, wherein a break region of the anchor end is constructed and arranged to be broken after installation of the tie component with the wall section, the break region comprising a break back region, a vee notch, or a radial scoring.

42. The component of claim 41, wherein the adjustment end comprises a threaded coil, a wound coil, a tapped nut, or a sleeve.

43. The component of claim 42, wherein the adjustment end includes a threaded coil and the adjustment member comprises a threaded rod constructed and arranged to engage with the threaded coil such that, upon rotation of the threaded rod with respect to the threaded coil, the threaded rod moves through a lumen defined by the threaded coil.

44. The component of claim 41, wherein the swivel end of one of the first and second portions comprises a receiving conduit.

45. The component of claim 44, wherein the receiving conduit comprises a coil.

46. The component of claim 44, wherein the swivel end of the other of the first and second portions comprises a connecting rod constructed and arranged to be positioned within a lumen defined by the receiving conduit.

47. The component of claim 46, wherein the connecting rod and the receiving conduit are constructed and arranged to rotate freely with respect to one another.

48. The component of claim 47, wherein the connecting rod is unthreaded.

49. The component of claim 46, wherein the swivel end of the first portion comprises the connecting rod and the swivel end of the second portion comprises the receiving conduit.

50. The component of claim 41, wherein the break region includes a thinned portion of the anchor end.

51. The component of claim 41, wherein the anchor end comprises a loop end, a bent end, a button-head end, a button tie end, a loop tie end, an aluminum form tie end, a resi-panel tie end, or a snap tie end.

52. The component of claim 41, further comprising a cone disposed adjacent to the swivel end of the first portion.

53. A tie component, comprising:
a first portion having an anchor end adapted to be fixed to a wall section and a swivel end located opposite the anchor end;
a second portion having an adjustment end adapted to engage with an adjustment member and a swivel end located opposite the adjustment end, wherein the swivel end of the first portion and the swivel end of the second portion are constructed and arranged to swivel freely with respect to one another; and
a cone disposed adjacent to the swivel end of the first portion.

54. The component of claim 53, wherein the adjustment end comprises a threaded coil, a wound coil, a tapped nut, or a sleeve.

55. The component of claim 54, wherein the adjustment end includes a threaded coil and the adjustment member comprises a threaded rod constructed and arranged to engage with the threaded coil such that, upon rotation of the threaded rod with respect to the threaded coil, the threaded rod moves through a lumen defined by the threaded coil.

56. The component of claim 53, wherein the swivel end of one of the first and second portions comprises a receiving conduit.

57. The component of claim 56, wherein the receiving conduit comprises a coil.

58. The component of claim 56, wherein the swivel end of the other of the first and second portions comprises a connecting rod constructed and arranged to be positioned within a lumen defined by the receiving conduit.

59. The component of claim 58, wherein the connecting rod and the receiving conduit are constructed and arranged to rotate freely with respect to one another.

60. The component of claim 59, wherein the connecting rod is unthreaded.

61. The component of claim 58, wherein the swivel end of the first portion comprises the connecting rod and the swivel end of the second portion comprises the receiving conduit.

62. The component of claim 53, wherein a break region of the anchor end is constructed and arranged to be broken after installation of the tie component with the wall section.

63. The component of claim 62, wherein the break region includes a thinned portion of the anchor end.

64. The component of claim 62, wherein the break region comprises a break back region, a vee notch, or a radial scoring.

65. The component of claim 53, wherein the anchor end comprises a loop end, a bent end, a button-head end, a button tie end, a loop tie end, an aluminum form tie end, a resi-panel tie end, or a snap tie end.

* * * * *